(12) United States Patent
Ishikawa et al.

(10) Patent No.: US 7,154,675 B2
(45) Date of Patent: Dec. 26, 2006

(54) IMAGE DISPLAY APPARATUS

(75) Inventors: Masaru Ishikawa, Tokorozawa (JP);
Takashi Nakano, Tokorozawa (JP);
Akira Imamura, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/693,494

(22) Filed: Oct. 27, 2003

(65) Prior Publication Data
US 2004/0085643 A1    May 6, 2004

(30) Foreign Application Priority Data
Nov. 1, 2002    (JP) .............................. 2002-319679

(51) Int. Cl.
*G02B 27/10* (2006.01)
*G03B 21/60* (2006.01)

(52) U.S. Cl. ...................... 359/622; 359/619; 359/621; 359/626; 359/455; 359/456

(58) Field of Classification Search ................ 359/619, 359/621, 622, 625, 626, 455, 456; 349/95; 348/44; 345/419; 353/32
See application file for complete search history.

(56) References Cited

U.S. PATENT DOCUMENTS

| | | | | |
|---|---|---|---|---|
| 4,414,565 A | * | 11/1983 | Shanks | 348/44 |
| 6,462,794 B1 | * | 10/2002 | Yoshikawa et al. | 349/95 |
| 6,462,795 B1 | * | 10/2002 | Clarke | 349/95 |
| 6,714,173 B1 | * | 3/2004 | Shinoura | 345/32 |

FOREIGN PATENT DOCUMENTS

JP          10-221644          8/1998

* cited by examiner

*Primary Examiner*—Loha Ben
*Assistant Examiner*—Jack Dinh
(74) *Attorney, Agent, or Firm*—McGinn IP Law Group, PLLC

(57) ABSTRACT

An image display apparatus includes a display having an image display surface which displays a two-dimensional image of an object including a three-dimensional object, and an image transmitting panel spaced apart from the image display surface for creating an imaging plane displaying a real image of the two-dimensional image in a space opposite to the display. The image transmitting panel and the imaging plane are non-parallel with each other.

18 Claims, 7 Drawing Sheets

IMAGE DISPLAY APPARATUS

BACKGROUND OF THE INVENTION

1) Field of the Invention

The present invention relates to an image display apparatus for displaying a two-dimensional image of an object including a three-dimensional object.

2) Description of the Related Art

In order to reproduce a three-dimensional image, a polarizing method is often used, in which a viewer wears polarizing glasses for viewing left and right parallax images based on different polarized states with respect to each other. However, such method is cumbersome for the viewer since wearing the polarizing glasses is necessary.

On the other hand, there is a known three-dimensional image display apparatus which does not use the polarizing glasses, such as a displaying method which uses a lenticular lens in order to provide viewer's eyes with parallax images corresponding to left and right images, and thus the viewer can recognize a three-dimensional image. In such apparatus, two parallax images respectively composed of strip-shaped images are alternately arranged one after another. Consequently, resolution of the image is reduced by half when displaying the three-dimensional image.

A three-dimensional image display apparatus has been proposed which utilizes polarizing means when viewing the three-dimensional image by using the lenticular lens. The polarizing means includes polarizing boards which are arranged one after another in a predetermined direction with a predetermined pitch. Each polarizing board has an individual polarizing axis which intersects at a right angle to a polarizing axis of the adjacent board. Consequently, an unnecessary reflection from a display surface is prevented and problems such as a moire and a color gap are reduced (for example, Japanese Patent Kokai No. 10-221644).

In any conventional three-dimensional image display apparatuses, the parallax images corresponding to left and right eye images are necessary from the beginning, i.e., when picking up the images of the object, and therefore, a number of means are necessary for creating such images.

In order to view the three-dimensional image using the conventional lenticular lens, utilization of a special image is necessary. The special image is made by synthesizing strip-shaped images originating from two or more images, which are respectively obtained by viewing the object from two or more directions. Accordingly, there is a need for an image display apparatus which can provide a three-dimensional image from an ordinary photograph or a picture, and thus which does not require two or more images obtained by viewing the object from two or more directions.

SUMMARY OF THE INVENTION

An object of the present invention is to provide an image display apparatus with a simple structure which can display an image of an object including a three-dimensional object.

According to one aspect of the present invention, an image display apparatus includes a display having an image display surface which displays a two-dimensional image of an object including a three-dimensional object, and an image transmitting panel spaced apart from the image display surface for creating an imaging plane displaying a real image of the two-dimensional image in a space opposite to the display. The image transmitting panel and the imaging plane are non-parallel with each other.

According to another aspect of the present invention, an image display apparatus includes a display having an image display surface which displays a two-dimensional image of an object including a three-dimensional object, and an image transmitting panel spaced apart from the image display surface for creating an imaging plane displaying a real image of the two-dimensional image in a space opposite to the display. The apparatus includes a non-parallel area in which the image transmitting panel and the imaging plane are non-parallel with each other, and a parallel area in which the image transmitting panel and the imaging plane are parallel with each other.

DETAILED DESCRIPTION OF THE INVENTION

Embodiments of an image display apparatus for displaying a two-dimensional image of an object including a three-dimensional object according to the present invention will be hereinafter described with reference to the attached drawings.

Figure 1:
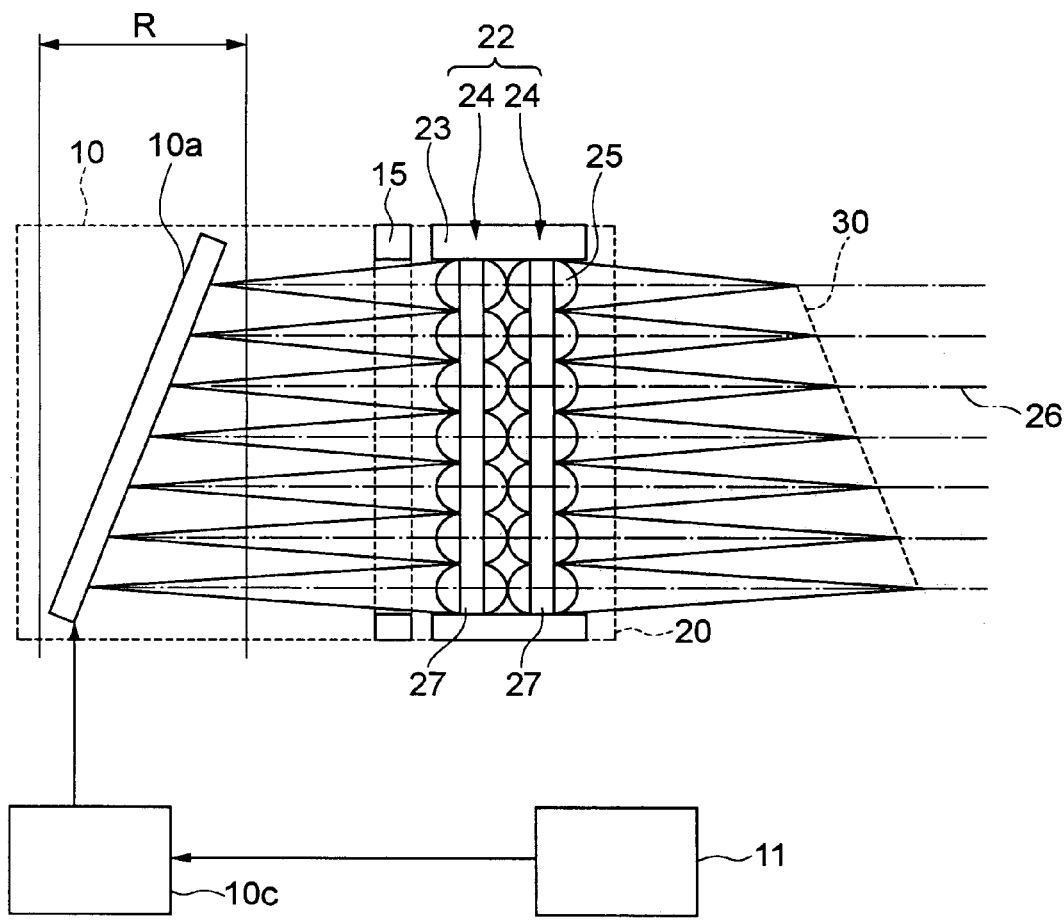
FIG. 1 shows a schematic cross-sectional view of major elements of an image display apparatus according to an embodiment of the present invention.

FIG. 1 shows a schematic cross-sectional view of major elements of the image display apparatus according to one embodiment. The image display apparatus includes a display 10, and an image transmitting panel 20 supported by a support member 15 fixed to the display 10. A display panel 10a can be, for example, a color liquid crystal display panel which can display a two-dimensional image. Furthermore, the apparatus includes a driving circuit 10c connected to the display panel 10a, and an image signal supplying section 11 connected to the driving circuit 10c so as to supply an image signal of the two-dimensional image of the object including the three-dimensional object. The image transmitting panel 20 focuses the two-dimensional image in such a manner that an imaging plane 30 is created in a space opposite to the display 10 with respect to the image transmitting panel 20.

The image transmitting panel 20 includes a micro lens array 22 and a lens frame area 23 such as a lens frame, which surrounds an effective area of the micro lens array. The micro lens array 22 includes two lens array halves 24 connected to each other by the lens frame area 23 so as to form a micro convex lens board. The lens frame area 23 is supported by the support member 15. The image transmitting panel 20 is positioned spaced apart from an image display surface of the display panel 10a. The micro lens array 22 is defined as an upright image optical system having a 100% magnification which provides a viewer with a two-dimensional image of the object including an upright image. The micro lens array has an effective area larger than the image of the object which is displayed as the two-dimensional image.

The lens array half 24 includes the convex lenses 25 and a transparent flat plate 27, which are both made from, for example, acrylic. The transparent flat plate 27 may be made from light-transmissive materials such as glass. All of the convex lenses 25 are made from the same material and have the same shape. For example, the convex lenses 25 are arranged adjacent with each other in a matrix fashion on the transparent flat plate. The micro lens array 22 includes a plurality of micro lenses which are arranged two-dimensionally. Optical axes 26 of a pair of right and left convex lenses 25 coincide with each other when the convex lenses 25, respectively included in the two lens array halves 24, are juxtaposed with each other. Therefore, a plurality of lens systems are allocated two-dimensionally on the micro convex lens board, such that the optical axes of the pairs of convex lenses 25 are parallel with each other. Each of the lens systems has a pair of convex lenses 25 such that optical axes of the respective convex lenses coincide with each other. A combination of focal points of a plurality of the lens systems having the same focal lengths defines the imaging plane 30. In this embodiment, the apparatus is configured such that the image display surface of the display panel 10a is positioned within a focal depth of a plurality of the convex lenses 25, and the micro lens array 22 and the imaging plane 30 are non-parallel with each other. In FIG. 1, the display panel 10a is inclined toward the image transmitting panel 20 such that an upper distance between the display panel 10a and the image transmitting panel 20 is less than a lower distance therebetween. Accordingly, the imaging plane 30 is inclined toward the image transmitting panel 20 such that an upper distance between the imaging plane 30 and the image transmitting panel 20 is less than a lower distance therebetween. A three-dimensional image created on the inclined imaging plane 30 provides a viewer with a real image that provides a viewer with a feeling of viewing the image from a perspective viewpoint, thereby giving an increased three-dimensional impression to the viewer. When the displaying surface of the display panel 10a for displaying the two-dimensional image is positioned outside the focal depth R of the lens or the lens system, a defocused real image is created.

Figure 2:
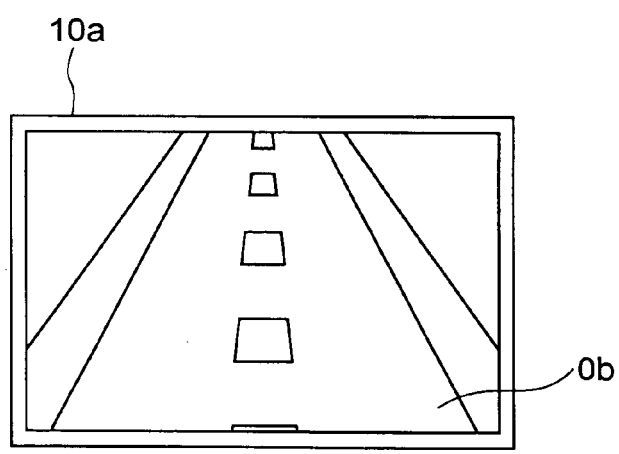
FIG. 2 illustrates a front view of the image display apparatus shown in FIG. 1, which shows a displayed image.
Figure 3:
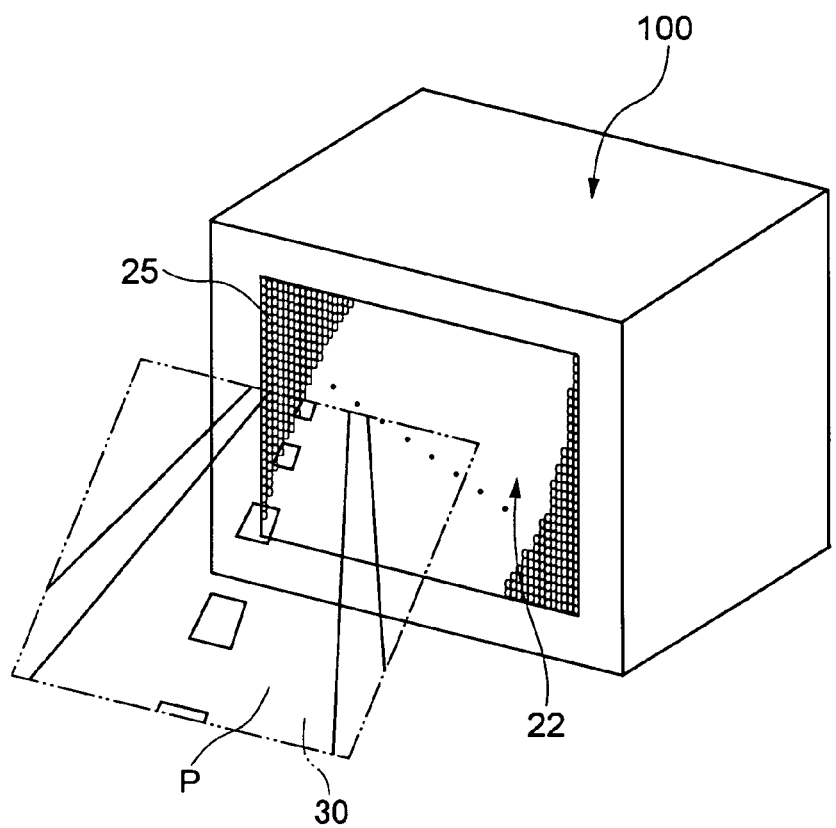
FIG. 3 shows a schematic perspective view of the image display apparatus shown in FIG. 1.

For example, when an image Ob providing a viewer with a perspective feeling along the inclined direction such as an image of a road is displayed on the display panel 10a as shown in FIG. 2, a real image P of the three-dimensional image which is displayed on the imaging plane 30 by the micro lens array 22 exhibits an increased perspective feeling as shown in FIG. 3. Accordingly a viewer feels an increased three-dimensional impression. Specifically, positioning the image display surface of the display panel 10a at a non-right angle to the optical axes of the lenses 25 enhances the perspective feeling. In FIG. 3, the display is located in a housing 100 behind the micro lens array 22.

When a static image or a moving image having an upward and downward movement, such as flowing water of a waterfall, is displayed on the display panel 10a, a three-dimensional image displayed on the imaging plane 30 provides an image with much more perspective feeling. Accordingly, a viewer feels an increased three-dimensional impression. When a background image displayed on the display panel 10a is made dark, the three-dimensional impression is enhanced.

When the degree of the inclination is increased such that the upper part of the display panel 10a is much closer to the micro lens array 22, a part of the display panel 10a is likely to be displaced from the focal depth R of the micro lens array. An image displayed on a part of the display panel 10a which is far apart from the micro lens array, for example, an image displayed at a lower part of the display panel 10a in FIG. 1, is likely to be displaced from the focal depth of the lens. When the display panel 10a is displaced from the focal depth, a three-dimensional image created on the imaging plane 30 becomes defocused. Therefore, it is preferable to position the display panel 10a within the focal depth R of the micro lens.

Figure 4:
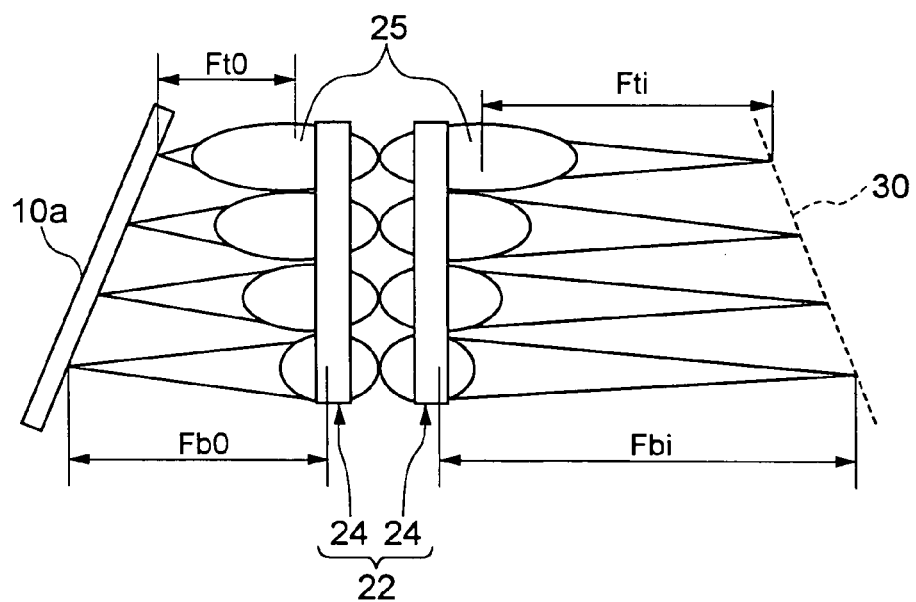
FIG. 4 shows a fragmentary sectional view of a micro lens array of an image display apparatus according to another embodiment of the present invention.

In another embodiment shown in FIG. 4, therefore, the lens systems are configured in such a manner that the curvatures of the convex lenses 25 are gradually decreased as the position of the lenses become lower, and thus, the focal lengths of the lenses are gradually increased (Fto<Fbo, Fti<Fbi). The lens systems including convex lenses 25 have respective focal lengths, which define the imaging plane 30 having a flat shape and inclining toward the micro lens array 22. Accordingly, the display panel 10a can be positioned within the focal depth of the convex lenses 25, even though the display panel 10a has an inclination. A method to adjust the focal depth is not limited to the above-described embodiment, i.e., the curvatures of the convex lenses 25 are gradually increased as the position of the lenses become higher in order to alter the focal lengths. Each of the focal depths of the convex lenses 25 may be adjusted by altering individual features of the lenses such as material and structure. Accordingly, each convex lens 25 has its own focal length which corresponds to the distance between the display panel 10a and the convex lens 25. When the curvature of the convex lens 25 provided on the left side (input side) is larger than the curvature of the convex lens 25 provided on the right side (output side) with respect to a pair of lenses respectively included in the lens array halves 24, the distance between the display panel 10a and the lens surface of the left side lens array half 24 becomes shorter than the distance between the imaging plane 30 and the lens surface of the right side lens array half 24.

Figure 5:
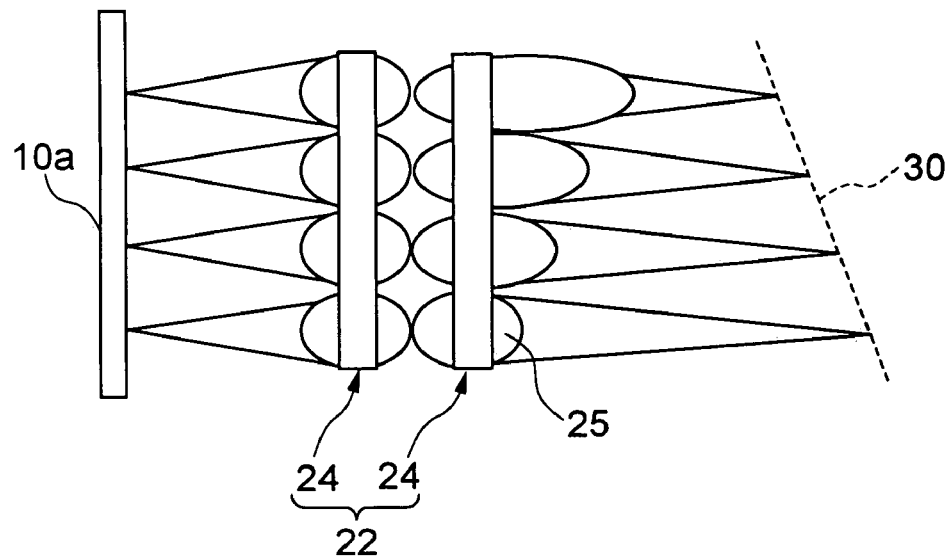
FIG. 5 shows a fragmentary sectional view of a micro lens array of an image display apparatus according to still another embodiment of the present invention.

In yet another embodiment, convex lenses 25 are configured to have such focal lengths that an imaging plane 30 having a flat shape and inclining toward the micro lens array 22 is created in the imaging side as shown in FIG. 5. Accordingly, the inclination of the imaging plane 30 can be achieved without inclining the display panel 10a, i.e., the display panel 10a can be positioned parallel to the micro lens array 22. Specifically, the image display surface of the display panel 10a can be positioned perpendicular to the optical axes of the convex lenses 25. This configuration achieves a sufficient distance between the imaging plane 30 and the image transmitting panel 20, and provides the image display apparatus having a compact depth (thickness).

Figure 6:
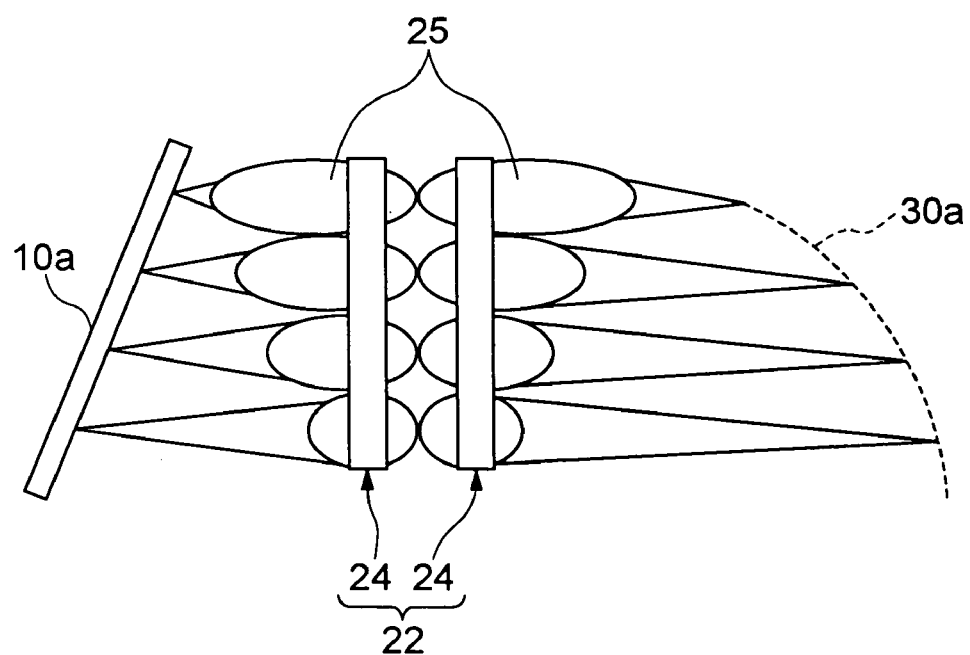
FIG. 6 shows a fragmentary sectional view of a micro lens array of an image display apparatus according to a further embodiment of the present invention.
Figure 7:
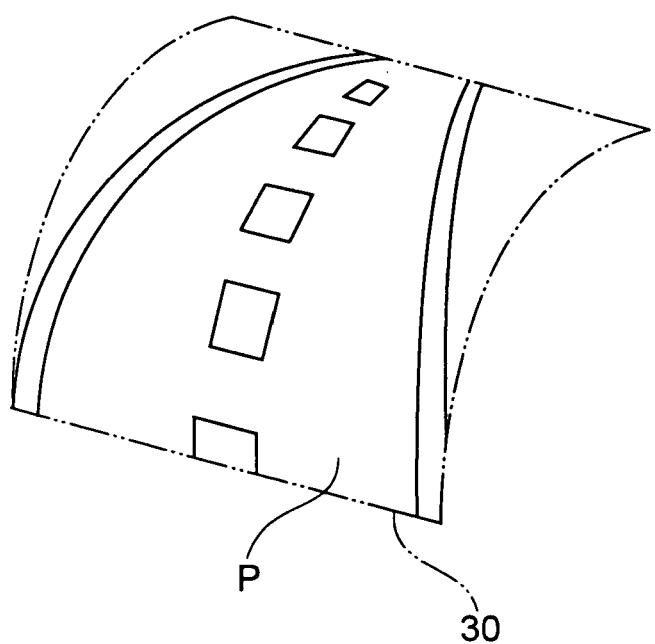
FIG. 7 shows a schematic perspective view of an imaging plane of an image display apparatus according to another embodiment of the present invention.
Figure 8:
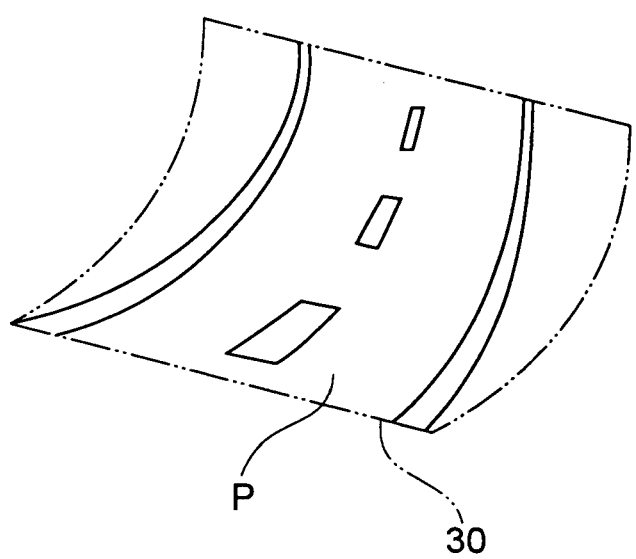
FIG. 8 shows a schematic perspective view of an imaging plane of an image display apparatus according to a further embodiment of the present invention.

In the above-described embodiments, the convex lenses 25 are configured such that the imaging plane 30 has a flat shape and inclines toward the micro lens array 22. As a further embodiment, the convex lenses 25 are configured to have such focal lengths that an imaging plane 30a having a curved shape and inclining toward the micro lens array 22 is created in the imaging side as shown in FIG. 6. Accordingly, an imaging plane having a convex curved shape 30a inclining toward the micro lens array 22 can be, for example, created as shown in FIG. 7. Alternatively, an imaging plane of a real image having a concave curved shape 30a can be created as shown in FIG. 8. These imaging planes having the curved shapes exhibit three-dimensional images on the imaging plane, which have much more perspective feeling. Accordingly, a viewer has a stronger impression of a three-dimensional view.

Figure 9:
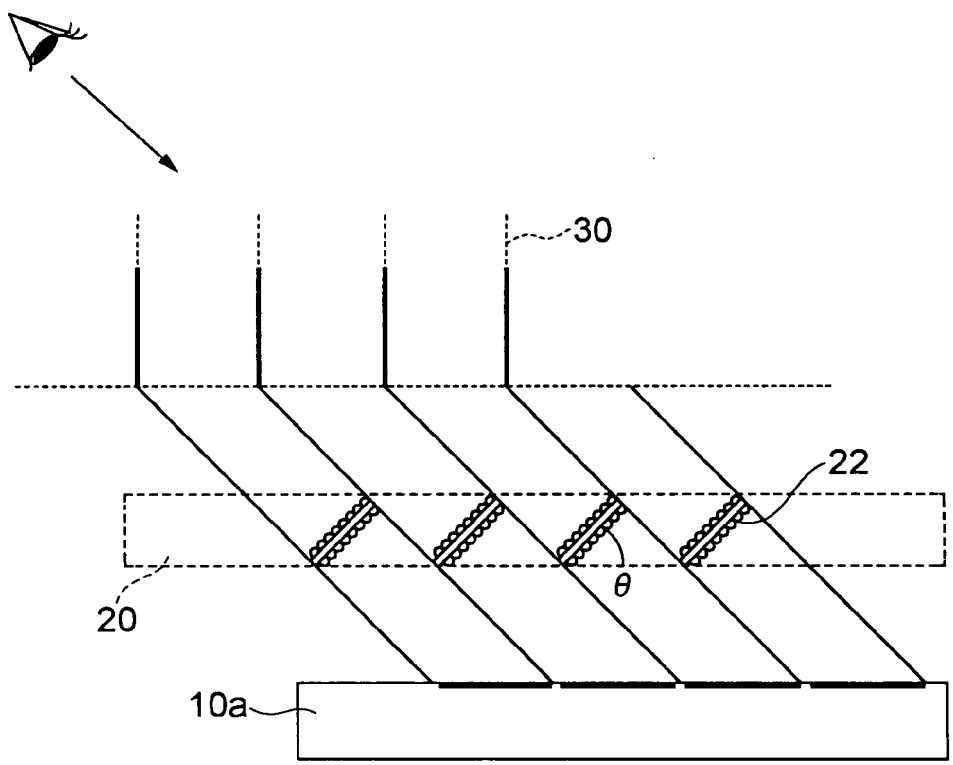
FIG. 9 shows a schematic cross-sectional view of major elements of an image display apparatus according to another embodiment of the present invention.

In yet another embodiment, a plurality of micro lens arrays 22 are respectively connected to the image transmitting panel 20 at a predetermined angle θ such as 45 degree to the lens frame area as shown in FIG. 9, which can create a plurality of imaging planes 30. In the structure, the micro lens arrays 22 are inclined toward the display panel 10a, and are positioned at the same distance from the display panel 10a. Therefore, the display panel 10a can be positioned within the focal depth of the micro lens arrays 22.

Figure 10:
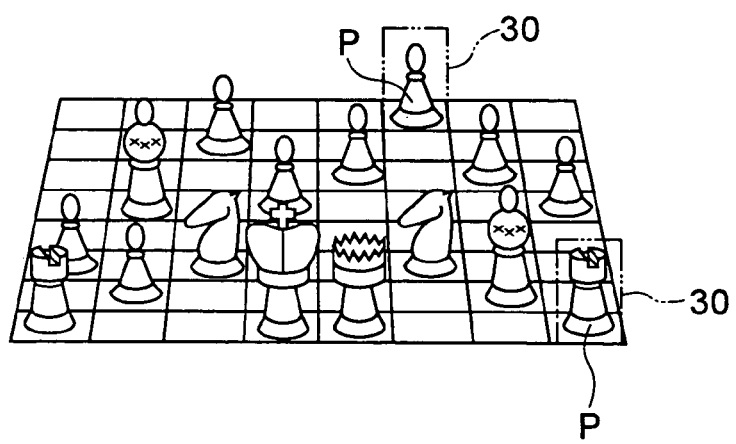
FIG. 10 shows a schematic perspective view of an imaging plane of an image display apparatus according to yet another embodiment of the present invention.

When, for example, chess pieces are displayed on the display panel 10a so that each chess piece corresponds to an individual micro lens array 22, a three-dimensional image of bird's eye view is reproduced as shown in FIG. 10. Such image is composed of real images of chess pieces, which are respectively projected three-dimensionally.

This embodiment also has an effect to display a large three-dimensional image without the necessity of a large micro lens array 22. Namely, such large image can be displayed by using small or regular-sized micro lens arrays. Furthermore, an individual inclination of each imaging plane 30 provides a simple structure in displaying the three-dimensional image, and provides a viewer with an increased three-dimensional impression.

It should be noted that the display panel 10a of the display 10 is not limited to the color liquid crystal display panel. For example, display apparatuses such as a cathode ray tube, a plasma display or an organic electroluminescence display may be utilized. Moreover, the display panel 10a may include an enlarged image display surface of a flat shape such as a positive print or a positive film for a slide projector, or a reversal film prepared by applying a transparent color-printing on a transparent film, and a back lighting unit for back illumination. The image display apparatus may further include a second display such as a reversal film which is positioned between the imaging plane 30 and the image transmitting panel 20.

As described above, the image display surface of the display 10, i.e., the display panel 10a, is positioned within a depth of field in the vicinity of the object side focal plane, which is defined by the micro lens array 22 of the image transmitting panel 20. When the object image is displayed on the image display surface of the display 10, the image is focused on the imaging plane 30 on or in the vicinity of the image side focal plane. Accordingly, a real image of the object can be viewed from the approximate direction of the optical axis. Since a reproduced real image is obtained from the object image displayed on the image display surface of the display 10, the image display surface side is the object side.

Figure 11:
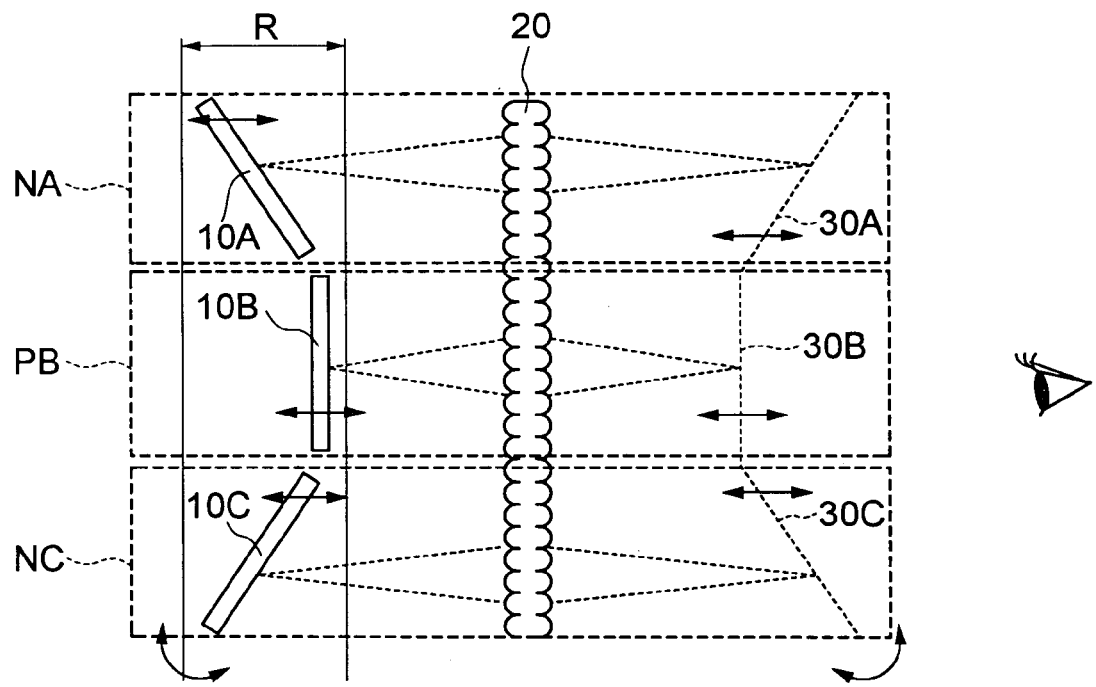
FIG. 11 shows a schematic cross-sectional view of major elements of an image display apparatus according to a further embodiment of the present invention.

In yet another embodiment, an image display apparatus may be configured to include non-parallel areas NA and NC, and a parallel area PB. In the non-parallel areas, imaging planes 30A and 30C are non-parallel to the micro lens array 22, whereas in the parallel area PB, an imaging plane 30B is parallel to the micro lens array 22 as shown in FIG. 11. The parallel area PB is approximately positioned in front of the viewer's eyes, and the non-parallel areas NA and NC are positioned above and below the parallel area PB, respectively.

Figure 12A:
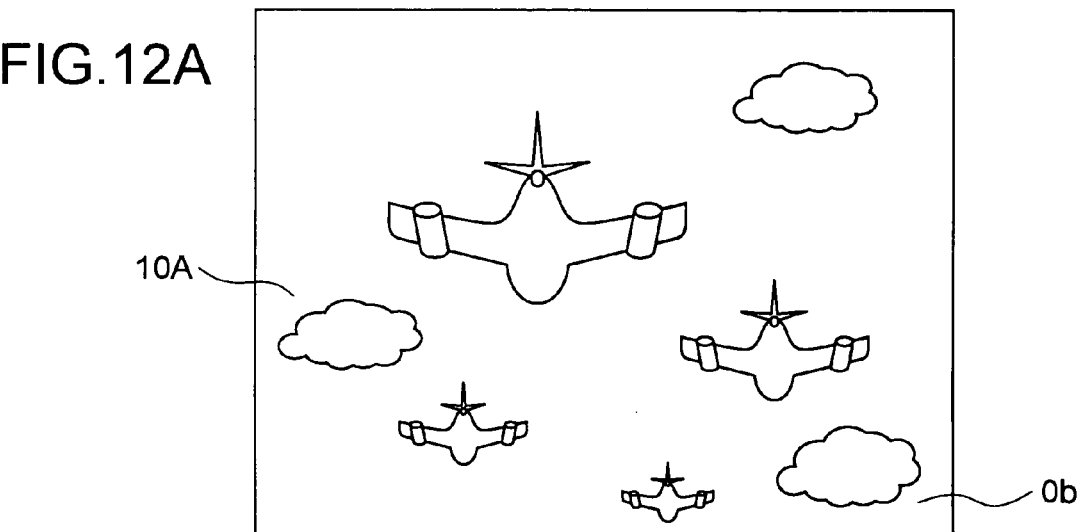
FIGS. 12A, 12B and 12C illustrate in combination a front view of an image display apparatus according to another embodiment of the present invention, showing combined displayed images.
Figure 12B:
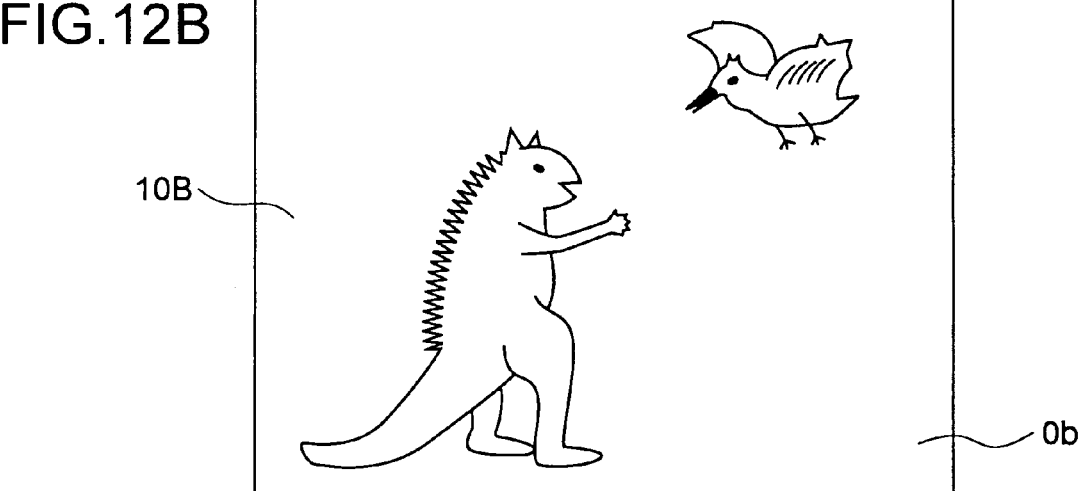
Figure 12C:
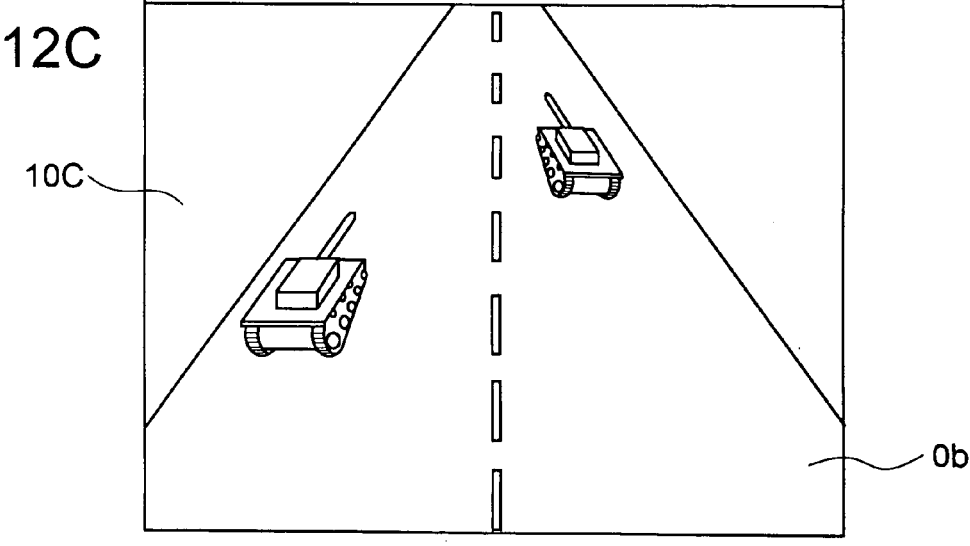

The image display surface of the display panel 10A displays a so-called "looking-up image" in the non-parallel area NA, which is an image Ob having a perspective feeling along the inclined direction of the imaging plane as shown in FIG. 12A. For example, such image exhibits a perspective feeling that the image at the higher position of the display panel gives the impression of being positioned closer to the viewer. On the other hand, the image at the lower position of the display panel gives the impression of being positioned farther from the viewer. The image display surface of the display panel 10C displays a so-called "looking-down image" in the non-parallel area NC, which is an image Ob having a perspective feeling along the inclined direction of the imaging plane as shown in FIG. 12C. For example, such image exhibits a perspective feeling that the image at the higher position of the display panel gives the impression of being positioned farther from the viewer. On the other hand, the image at the lower position of the display panel gives the impression of being positioned closer to the viewer. The viewer perceives such perspective feeling for the following reason. When the object is positioned above the horizontal visual axis of a viewer under the normal situation, the viewer perceives the position of the object in such a manner that an object with a greater angle of elevation in the screen is positioned closer to the viewer, whereas an object with a smaller angle of elevation in the screen is positioned farther from the viewer. On the other hand, when the object is positioned below the horizontal visual axis of the viewer, the viewer perceives the position of the object in such a manner that an object with a greater angle of depression in the screen is positioned closer to the viewer, and an object with a smaller angle of depression in the screen is positioned farther from the viewer.

Image display surfaces of the display panels 10A, 10B and 10C are positioned within the focal depth R of the lenses as shown in FIG. 11. The lenses in the micro lens array form lens systems, and each lens system has one pair of convex lenses coaxial with each other. Each of the non-parallel areas NA and NC, and parallel area PB has at least one lens system. The micro lens array 22 forms a micro convex lens board in which the lenses are allocated two-dimensionally such that optical axes of the lens systems are parallel with each other, which is similar to the above-described embodiments.

In the non-parallel areas NA and NC, the display panels 10A and 10C are respectively positioned at non-right angles relative to the optical axes of the lenses. On the other hand, in the parallel area PB, the image display surface of the display panel 10B is positioned perpendicular to the optical axes of the lenses.

In the non-parallel areas NA and NC, the lenses may have focal lengths in manners similar to the embodiments shown in FIGS. 4 and 5 so that an imaging plane having a flat shape and inclining toward the micro lens array 22 is created in the imaging side. Accordingly, the display panels 10A, 10B and 10C can be positioned parallel to the micro lens array 22. Furthermore, in the non-parallel areas NA and NC, the lenses of the micro lens array 22 may be configured to have focal lengths such that an imaging plane 30 having a curved shape and inclining toward the micro lens array is created in the imaging side, which is similar to the embodiment shown in FIG. 6.

In the non-parallel areas NA and NC, and the parallel area PB, the image display surfaces of the display panels 10A, 10B and 10C may display moving images having movement along the inclined directions of the imaging planes. Furthermore, the display panels 10A, 10B and 10C may be equipped with mechanisms (not shown) for allowing the panels to move in backward and forward directions, and/or in inclined directions. Accordingly, three-dimensional images can be controlled for giving an increased dynamic impression. Application of the movement to the display panels 10A, 10B and 10C in synchronization with the displayed contents of the respective display panels 10A, 10B and 10C can display the image with the much enhanced three-dimensional impression.

This application is based on a Japanese patent application No. 2002-319679 which is incorporated herein by reference.

What is claimed is:

1. An image display apparatus providing an enhanced impression of an optical perspective, said apparatus comprising:
    at least one micro lens array assembly, each comprising at least one micro convex lens board having two lens array halves mounted substantially parallel to each other, each said lens array half comprising a transparent flat plate with a plurality of convex lenses arranged in a matrix on each flat surface thereof and said lens array halves being aligned appropriately in said micro lens array to thereby form a lens system for each said micro convex lens in each said matrix of convex lenses; and
    for each said at least one micro lens array assembly, a display located relative to said micro lens array assembly to project a two-dimensional image through said micro lens array assembly to be focused in a space on an opposite side thereof as an imaging plane, each said at least one micro lens array assembly displaying an erect real image of the two-dimensional image,
    wherein a shape of said imaging plane relative to a viewer provides an enhanced three-dimensional impression of said two-dimensional image by providing an illusion of depth in the displayed real image that is consistent with a three-dimensional object.

2. The apparatus of claim 1, wherein a magnification of said erect image is approximately unity.

3. The apparatus of claim 1, wherein said shape of said imaging plane providing said enhanced three-dimensional impression is caused by at least one of:
    locating said least one micro lens array assembly relative to said display in an inclined orientation consistent with a perspective effect if a viewer were viewing said three-dimensional object; and
    providing a gradual change of curvature of said convex lenses on at least one said flat surface of at least one of said two lens array halves, thereby causing said imaging plane to bend in space consistent with said perspective effect of said three-dimensional object.

4. The apparatus of claim 3, wherein said at least one micro lens array assembly comprises a plurality of micro lens array assemblies that together provide for a composite image presentation, each said micro lens array assembly having a corresponding display, wherein each said micro lens array assembly and its corresponding display separately contributes to an enhanced three-dimensional impression for an overall image, thereby providing said composite image wherein there are different components of which each contributes to said enhanced three-dimensional impression.

5. The apparatus of claim 1, wherein said imaging plane is flat.

6. The apparatus of claim 1, wherein said imaging plane is curved.

7. A method of providing an enhanced three-dimensional impression of a two-dimensional image, said method comprising:
    providing a micro lens array assembly comprising a plurality of convex micro lenses arranged in at least one matrix, said micro lens array assembly comprising at least one micro convex lens board having two lens array halves mounted substantially parallel to each other, each said lens array half comprising a transparent flat plate with a plurality of convex lenses arranged in a matrix on each flat surface thereof and appropriately aligned to thereby form a lens system; and
    projecting a two-dimensional image through said micro lens array assembly to be focused on an opposite side as an imaging plane, said imaging plane being a set of points in a space where said two-dimensional image is focused by said plurality of micro lenses in said at least one matrix,
    wherein said enhanced third-dimensional impression results from a shape of said imaging plane in space consistent with a perspective view of a three-dimensional object and said shape is caused by at least one of:
        locating said at least one micro lens array assembly relative to said display in an inclined orientation that is consistent with said three-dimensional perspective; and
        providing a gradual change of curvature of said convex lenses so that said imaging plane shape is consistent with said three-dimensional perspective in at least one said matrix of convex micro lenses, and
    wherein said micro lens array assembly displays an erect real image of the two-dimensional image at a same magnification.

8. An image display apparatus, comprising:
    a display for displaying a two-dimensional image; and
    a micro lens array spaced apart from the display for creating an imaging plane in a space opposite the display, the micro lens array being an upright image optical system, said micro lens array assembly comprising at least one micro convex lens board having two lens array halves mounted substantially parallel to each other, each said lens array half comprising a transparent flat plate with a plurality of convex lenses arranged in a matrix on each flat surface thereof and said lens array halves are aligned appropriately in said micro lens array to thereby form a lens system for each said micro convex lens in each said matrix.

9. The image display apparatus according to claim 8, wherein a plurality of said displays and said micro lens arrays together provides a composite image.

10. The image display apparatus according to claim 8, wherein the micro lens array has a magnification of approximately unity.

11. The image display apparatus according to claim 8, wherein the micro lens array is flat and the display partly bends relative to the micro lens array.

12. The image display apparatus according to claim 8, wherein the display is positioned within a focal depth of said micro lens array.

13. An image display apparatus comprising:
a display for displaying a two-dimensional image; and
a plurality of micro lens arrays spaced apart from the display such that each said micro lens array extends at a non-right angle with respect to the display and creates an erect real image of part of the two-dimensional image at a same magnification in a space opposite the display, each said micro lens array comprising at least one micro convex lens board having two lens array halves mounted substantially parallel to each other, each said lens array half comprising a transparent flat plate with a plurality of convex lenses arranged in a matrix on each flat surface thereof and said lens array halves are aligned appropriately in said micro lens array to thereby form a lens system for each said micro convex lens in each said matrix.

14. The image display apparatus according to claim 13, wherein said display has a plurality of sections which correspond to the plurality of micro lens arrays, respectively, and each of the plurality of sections displays different images or substantially different portions of a composite image.

15. The image display apparatus according to claim 13, wherein the display is positioned within a focal depth of each said micro lens array.

16. The image display apparatus according to claim 15, wherein distances between said plurality of sections of the display and the corresponding plurality of micro lens arrays are equal to each other.

17. The image display apparatus according to claim 13, wherein an imaging plane resulting from said plurality of micro lens arrays has a flat shape and inclines toward said micro lens array.

18. The image display apparatus according to claim 13, wherein an imaging plane resulting from said plurality of micro lens arrays has a curved shape and inclines toward each said micro lens array.

* * * * *